(12) United States Patent
Yan

(10) Patent No.: US 7,428,555 B2
(45) Date of Patent: *Sep. 23, 2008

(54) REAL-TIME, COMPUTER-GENERATED MODIFICATIONS TO AN ONLINE ADVERTISING PROGRAM

(75) Inventor: Weipeng Yan, Redwood City, CA (US)

(73) Assignee: Google Inc., Mountain View, CA (US)

( * ) Notice: Subject to any disclaimer, the term of this patent is extended or adjusted under 35 U.S.C. 154(b) by 501 days.

This patent is subject to a terminal disclaimer.

(21) Appl. No.: 11/102,856

(22) Filed: Apr. 7, 2005

(65) Prior Publication Data

US 2006/0230029 A1 Oct. 12, 2006

(51) Int. Cl.
*G06F 17/30* (2006.01)
(52) U.S. Cl. .............................. 707/104.1; 707/3; 707/6
(58) Field of Classification Search ............... 707/1–10, 707/100–104.1, 200–206; 718/106; 715/234
See application file for complete search history.

(56) References Cited

U.S. PATENT DOCUMENTS 6,317,738 B1 11/2001 Lohman et al. ................. 707/3
6,339,772 B1 1/2002 Klein et al. ..................... 707/4

OTHER PUBLICATIONS

Ahmed Metwally et al., "Duplicate Detection in Click Streams", 2004, www.cs.ucsb.edu/research/tech_reports, pp. 1-12.*
Christian Borgs, "Dynamics of Bid Optimization in online advertisement auctions", 2007, http:acm.org, pp. 531-540.*
Jon Feldman et al., "Budget optimization in search-based advertising auctions", 2007, Proc. of the 8th ACM conference, ACM, NY, NY, pp. 40-49.*
Bacarella, V. et al., "Discovery of ads web hosts through traffic data analysis", *DMKD '04*, Paris, France, Jun. 13, 2004, pp. 76-81.
Balakrishnan, H., et al., "Retrospective on Aurora", *VLDB Journal*, vol. 13, No. 4,, 2004.
*Bulletin of the Technical Committee on Data Engineering*, Special Issue on Data Stream Processing, IEEE Computer Society, vol. 26, No. 1, Mar. 2003.

(Continued)

*Primary Examiner*—Diane Mizrahi
(74) *Attorney, Agent, or Firm*—Morgan, Lewis & Bockius LLP

(57) ABSTRACT

A method and system for real-time, computer-generated modifications to an online advertising program is disclosed. One aspect of the invention involves a method at a computer associated with an ad placement provider. The method involves receiving a plurality of data streams containing real-time data concerning online advertisements in an online advertising program for an advertiser; applying a first continuous query to the plurality of data streams; generating a first ongoing response to the first continuous query; applying a second continuous query to the first ongoing response; generating a second response to the second continuous query; and in response to an event associated with generating the first or second response, implementing a computer-generated change in the advertising program in real time.

17 Claims, 6 Drawing Sheets

OTHER PUBLICATIONS

Carney, D., et al., "Operator Scheduling in a Data Stream Manager", *Proceedings of the 29th VLDB Conference*, Berlin, Germany, Sep. 9-12, 2003.

Chandrasekaran, S., et al., "PSoup: a system for streaming queries over streaming data", *The VLDB Journal*, 2003, pp. 140-156.

Chandrasekaran, S., et al., "Streaming Queries over Streaming Data", *Proceedings of the 28th VLDB Conference*, Hong Kong, China, 2002.

Cooke, A., et al., "R-GMA: An Information Integration System for Grid Monitoring", *CoopIS 2003*, Cartania, Sicily (Italy), Nov. 3-7, 2003.

Eugster, P. Th., et al, "The many Faces of Publish/Subscribe", *ACM Computing Surveys*, vol. 35, No. 2, Jun. 2003.

ezTrackz—Frequency Asked Questions, http://www.eztrackz.com/faq.htm (accessed Apr. 5, 2005).

ezTrack—Ad Tracker Product Sheet, http://www.eztrackz.com, (accessed Apr. 5, 2005).

"Features", *eVisit Analyst—Web Site Analysis*, http://evisitanalyst.com/features/php (accessed Apr. 5, 2005).

Gilani, A., "Design and Implementation of Stream Operators, Query Instantiator and Stream Buffer Manager", Master's Thesis, University of Texas at Arlington, Dec. 2003.

Golab, L., et al., "Data Stream Management Issues—A Survey", Technical Report CS-2003-08, University of Waterloo, Waterloo, Canada, Apr. 2003.

Google AdWords Program Comparison, http://adwords.google.com/select/comparison.html, (last accessed Feb. 18, 2005).

Gray, A, J.G., "Managing Views Over Streams", PhD First Year Report, Oct. 13, 2003.

Hellerstein, J., et al., "The Sensor Spectrum: Technology, Trends and Requirements", *ACM SIGMOD*, vol. 32, No. 4, Dec. 2003.

Hirshfeld, A., et al., "Continuous Queries and Publish/Subscribe", www.cs.brandeis.edu/~cs227b/slides/pubsubfinal.ppt.

Koudas, N. et al., *Data Stream Query Processing*, ATT Labs-Research, Jun. 7, 2004, http://www.vlbd.informatik.hu-berlin.de/ressources/vldb-2003-Tutorial%20T3.pdf.

Madden, S. et al., "Fjording the Stream: An Architecture for Queries over Streaming Sensor Data", *ICDE'02*, Feb. 26-Mar. 1, 2002, San Jose, CA.

*Managing Your Google AdWords Account, a Step-by-Step Guide*, Google, Inc.

"Measuring Your Success", *eVisit Analyst—Web Site Analysis*, http://evisitanalyst.com/index/php (accessed Apr. 5, 2005).

Motwani, R., et al., "Models and Issues in Data Stream Systems", *Proceedings of 21st ACM Symposium on Principles of Database Systems (PODS 2002)*, Madison, WI, Jun. 3-5, 2002.

The Stream Group (Arasu, A., et al.), "STREAM: The Stanford Stream Data Manager", *Bulletin of the IEEE Computer Society Technical Committee on Data Engineering*, vol. 2, No. 1, Mar. 2003.

Tcherevik, D., "A Publish/Subscribe Mechanism for Web Services", *Web Services Journal*, www.sys-con.com/webservices.

Terry, D., et al., "Continuous Queries over Append-Only Databases", *ACM SIGMOD*, Jun. 1992, pp. 321-330.

Zaniolo, C., et al., "The Design of Stream Mill: A Data Stream Management System of Many Uses", *NEDS*, Sep. 24, 2004, Volen 101, Brandeis University.

Zdonik, S., et al., "Streaming for Dummies", May 19, 2004.

Office Action dated May 12, 2008 issued in U.S. Appl. No. 11/102,862, 20 pages.

* cited by examiner

REAL-TIME, COMPUTER-GENERATED MODIFICATIONS TO AN ONLINE ADVERTISING PROGRAM

CROSS REFERENCE TO RELATED APPLICATIONS

This application is related to U.S. patent application Ser. No. 11/102,862, "Computing online advertising statistics in real time", filed Apr. 7, 2005.

TECHNICAL FIELD

The disclosed embodiments relate generally to online advertising. More particularly, the disclosed embodiments relate to methods and systems to automatically modify an online advertising program in real time.

BACKGROUND

Online advertising is an important advertising medium that continues to grow rapidly as use of the Internet expands. A key concern for advertisers is that the money that they spend on online advertisements be well spent. Consequently, online advertisers want feedback on the effectiveness of their advertisements so that they can adjust their advertising programs accordingly.

To date, because of the vast amount of advertising data (e.g., ad impression and click through logs) that must be evaluated, large-scale online ad placement providers (e.g., Google and Yahoo!) have only been able to generate statistics regarding online advertising on a daily basis. This delay can be costly for both the advertiser and the ad placement provider. For example, advertisers may continue to show unproductive ads or reach their daily spending limits too soon. Ad placement providers may lose revenue by displaying unproductive ads with few click throughs or by displaying ads that have run out of budget.

Advertisers generally don't find out about advertising problems until they take the initiative to review and analyze the statistics for their advertisements. This delay can be costly for both the advertiser and the ad placement provider, too.

SUMMARY

The present invention overcomes the limitations and disadvantages described above by generating statistics, alerts, and other information regarding online advertising in real time. As used herein, "real time" means within minutes, rather than hours or days. For example, cumulative statistics concerning online advertising are updated in real time, within minutes of new data being received. In this example, the real-time online advertising statistics are cumulative statistics that are based in part on data that was received within minutes of the statistics being generated or updated. Similarly, real-time alerts/notifications are based at least in part on data that was received within minutes of the alerts/notifications being generated, although clearly such alerts/notifications could also be based in part on data that was received hours or days before. Likewise, real-time modifications to an online advertising program mean changes in an online advertising program that are made within minutes of receiving an alert or other notification.

One aspect of the invention involves a method at a computer associated with an ad placement provider. The method involves receiving a plurality of data streams containing real-time data concerning online advertisements in an online advertising program for an advertiser; applying a first continuous query to the plurality of data streams; generating a first ongoing response to the first continuous query; applying a second continuous query to the first ongoing response; generating a second response to the second continuous query; and in response to an event associated with generating the first or second response, implementing a computer-generated change in the advertising program in real time.

Another aspect of the invention involves a computer system comprising at least one computer associated with an ad placement provider. The computer system is configured to receive a plurality of data streams containing real-time data concerning online advertisements in an online advertising program for an advertiser; apply a first continuous query to the plurality of data streams; generate a first ongoing response to the first continuous query; apply a second continuous query to the first ongoing response; generate a second response to the second continuous query; and in response to an event associated with generating the first or second response, implement a computer-generated change in the advertising program in real time.

Another aspect of the invention involves a machine readable medium having stored thereon data representing sequences of instructions, which when executed by a computer system associated with an ad placement provider, cause the computer system to receive a plurality of data streams containing real-time data concerning online advertisements in an online advertising program for an advertiser; apply a first continuous query to the plurality of data streams; generate a first ongoing response to the first continuous query; apply a second continuous query to the first ongoing response; generate a second response to the second continuous query; and in response to an event associated with generating the first or second response, implement a computer-generated change in the advertising program in real time.

Another aspect of the invention involves a computer system that includes means for receiving a plurality of data streams containing real-time data concerning online advertisements in an online advertising program for an advertiser; means for applying a first continuous query to the plurality of data streams; means for generating a first ongoing response to the first continuous query; means for applying a second continuous query to the first ongoing response; means for generating a second response to the second continuous query; and in response to an event associated with generating the first or second response, means for implementing a computer-generated change in the advertising program in real time.

Another aspect of the invention involves a method at a computer associated with an advertiser. The method involves receiving information associated with a first response, a second response, or both the first response and the second response. The first response is generated at a remote computer by applying a first continuous query to a plurality of data streams containing information about online advertisements in an online advertising program for the advertiser. The second response is generated at the remote computer by applying a second continuous query to the first response. The method also involves sending computer-generated instructions to change the online advertising program for the advertiser in real time.

Another aspect of the invention involves a system that includes a computer associated with an advertiser. The computer is configured to receive information associated with a first and/or second response. The first response is generated at a remote computer by applying a first continuous query to a plurality of data streams containing information about online advertisements in an online advertising program for the advertiser. The second response is generated at the remote computer by applying a second continuous query to the first response. The computer is also configured to send computer-generated instructions to change the online advertising program for the advertiser in real time.

Another aspect of the invention involves a machine readable medium having stored thereon data representing sequences of instructions, which when executed by a computer associated with an advertiser, cause the computer to receive information associated with a first and/or second response. The first response is generated at a remote computer by applying a first continuous query to a plurality of data streams containing information about online advertisements in an online advertising program for the advertiser. The second response is generated at the remote computer by applying a second continuous query to the first response. The machine readable medium also has stored thereon data representing sequences of instructions, which when executed by the computer associated with the advertiser, cause the computer to send computer-generated instructions to change the online advertising program for the advertiser.

Another aspect of the invention involves a system that includes a computer associated with an advertiser. The computer includes means for receiving information associated with a first and/or second response. The first response is generated at a remote computer by applying a first continuous query to a plurality of data streams containing information about online advertisements in an online advertising program for the advertiser. The second response is generated at the remote computer by applying a second continuous query to the first response. The computer also includes means for sending computer-generated instructions to change the online advertising program for the advertiser.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Methods and systems are described that generate and automatically respond to statistics, alerts, and other information regarding online advertising in real time. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, applications, components, networks, and database technologies that are well known to those of ordinary skill in the art are not described in detail to avoid obscuring aspects of the present invention.

Figure 1:
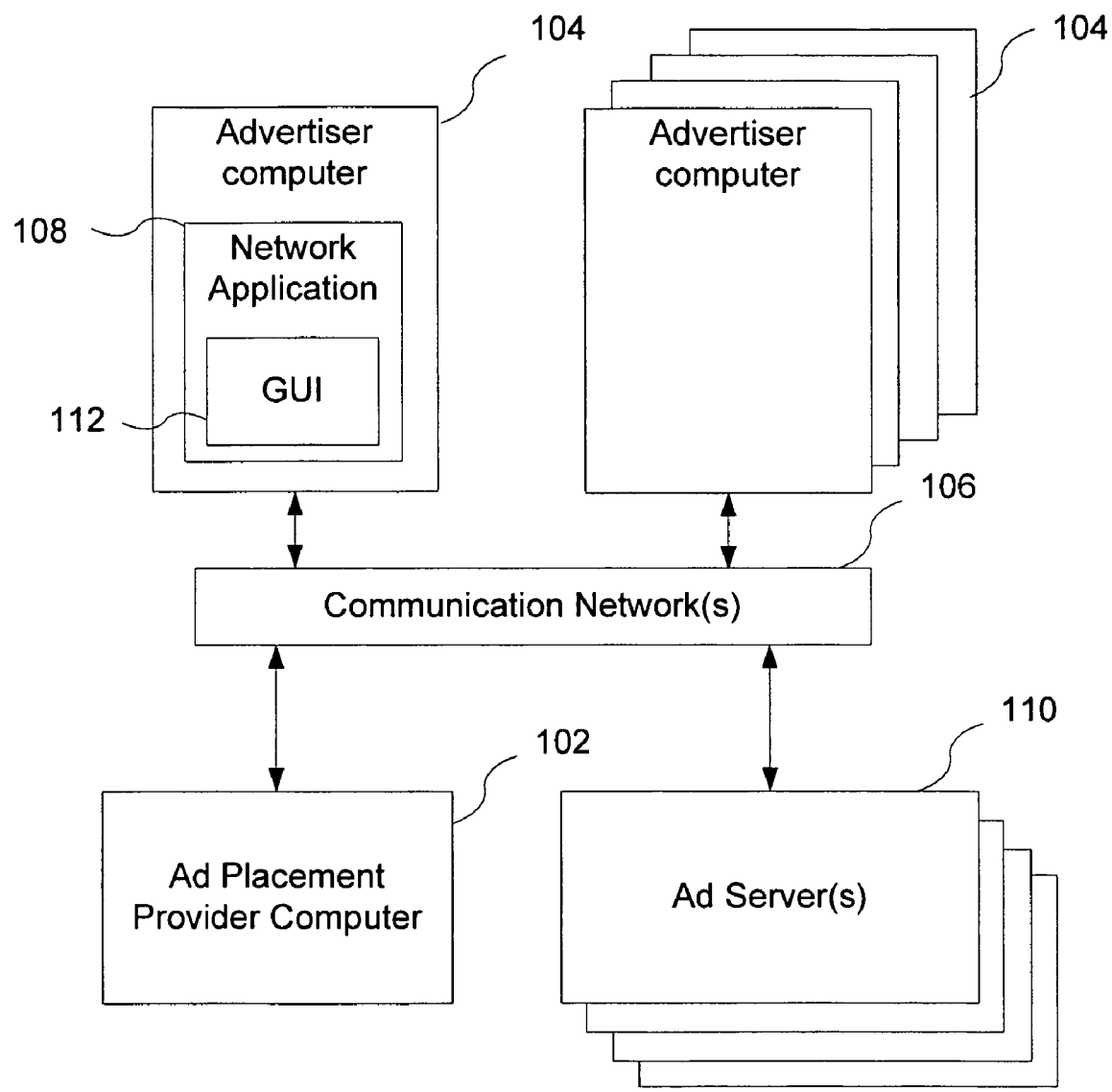
FIG. 1 is a block diagram illustrating an exemplary distributed computer system according to an embodiment of the invention.
Figure 2:
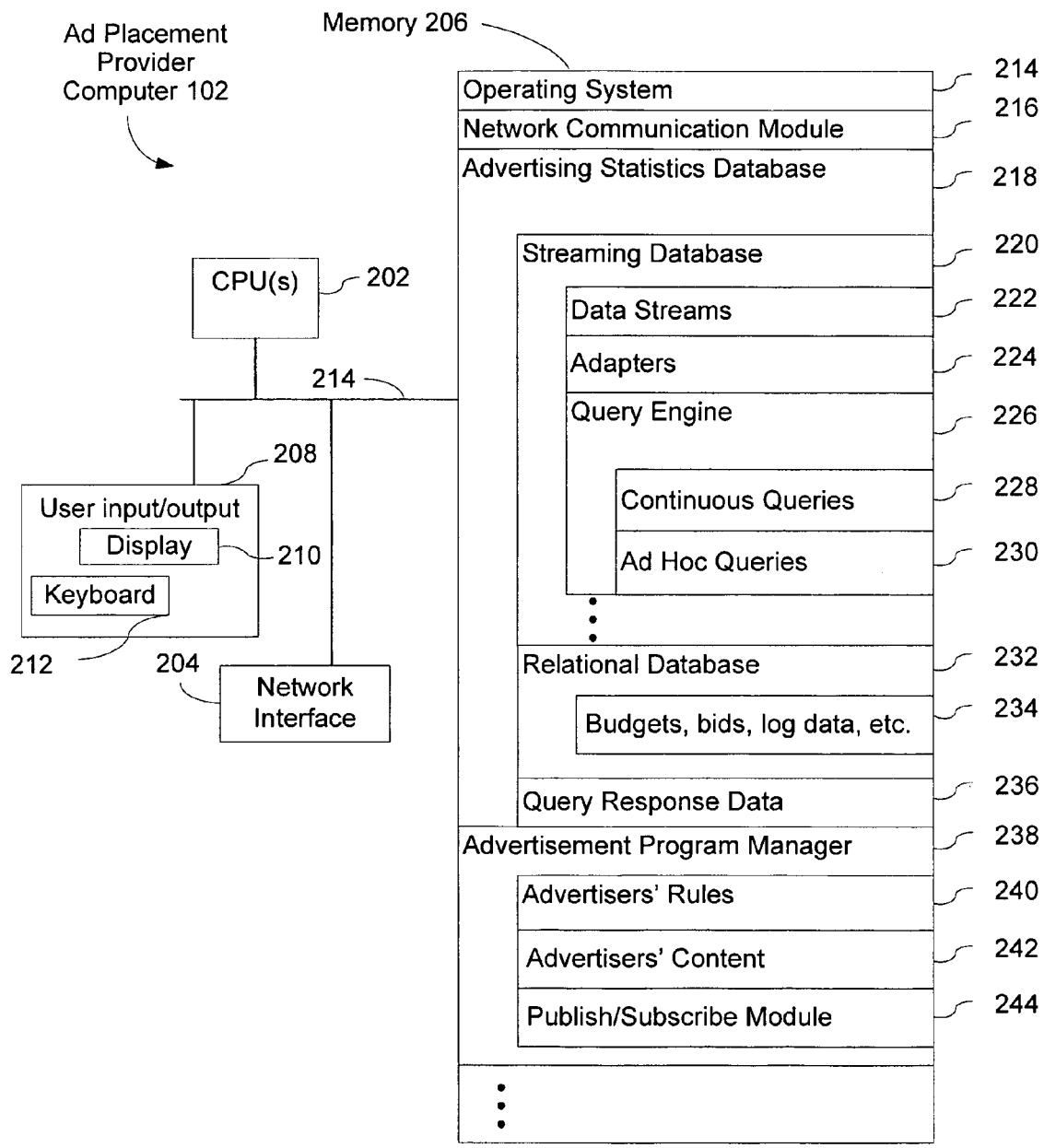
FIG. 2 is a block diagram illustrating an ad placement provider computer in accordance with one embodiment of the present invention.

FIG. 1 is a block diagram illustrating an exemplary distributed computer system according to one embodiment of the invention. This system includes ad placement provider computer 102, ad server(s) 110, advertiser computers 104, and communication network(s) 106 (e.g., the Internet) for interconnecting these components. In some embodiments, advertiser computers 104 include network application 108 and graphical user interface (GUI) 112. As used herein, a network application is a network-connected (e.g., Internet-connected) software application with its own user interface (e.g., a web browser application, an email application, a peer-to-peer transfer application, or an instant messaging application). Referring to FIGS. 1 and 2, streaming database 220 in ad placement provider computer 102 is configured to receive one or more data streams 222 containing real-time data concerning online advertisements for an advertiser. In some embodiments, the real-time data is contained in data logs sent from ad server(s) 110. Query engine 226 in ad placement provider computer 102 applies a continuous query to the one or more data streams and generates an ongoing response to the continuous query. Publish/subscribe module 244 in ad placement provider computer 102 sends at least a portion of the ongoing response to the advertiser computer 104 that subscribed to the result of the continuous query. Advertiser computer 104 receives at least a portion of the ongoing response to the continuous query.

Ad placement provider computer 102 is also configured to receive a plurality of data streams containing real-time data concerning online advertisements in an online advertising program for an advertiser, e.g., using streaming database 220. Query engine 226 in ad placement provider computer 102 applies a first continuous query to the plurality of data streams 222; generates a first ongoing response to the first continuous query; applies a second continuous query to the first ongoing response; and generates a second response to the second continuous query. In response to an event associated with generating the first or second response, advertising program manager 238 in ad placement provider computer 102 implements a computer-generated change in the advertising program in real time. In some embodiments, advertiser computer 104 receives information associated with the first response, the second response, or both the first response and the second response, and sends computer-generated instructions to change the online advertising program for the advertiser in real time.

FIG. 2 is a block diagram illustrating an ad placement provider computer in accordance with one embodiment of the present invention. Ad placement provider computer 102 typically includes one or more processing units (CPU's) 202, one or more network or other communications interfaces 204, memory 206, and one or more communication buses 208 for interconnecting these components. Ad placement provider computer 102 optionally may include a user interface 208 comprising a display device 210 and a keyboard 212. Memory 206 may include high speed random access memory and may also include non-volatile memory, such as one or more magnetic disk storage devices. Memory 206 may optionally include one or more storage devices remotely located from the CPU(s) 202. In some embodiments, the memory 206 stores the following programs, modules and data structures, or a subset or superset thereof:

- an operating system 214 that includes procedures for handling various basic system services and for performing hardware dependent tasks;
- a network communication module 216 that is used for connecting ad placement provider computer 102 to other computers (e.g., advertiser computers 104 and ad server(s) 110) via one or more communication network interfaces 204 (wired or wireless), which in turn connect ad placement provider computer 102 to one or more communications networks 106 such as the Internet, other wide area networks, local area networks, metropolitan area networks, and so on;
- an advertising statistics database 218 that provides advertising statistics to one or more advertiser computers 104 in real time and includes streaming database 220, relational database 232 and query response data 236; and
- an advertisement program manager 238 that implements the online advertising programs for a plurality of advertisers, which includes
  - advertisers' rules 240 that specify the online advertising programs for a plurality of advertisers, including in some embodiments how those programs are to be modified by responses to particular continuous queries of streaming database 220;
  - advertisers' content 242 that contains the online advertising content for a plurality of advertisers; and
  - a publish/subscribe module 244 that publishes particular query responses generated by advertising statistics database 218 to subscribers such as particular rules in the advertisers' rules 240 and/or advertiser computers 104 that subscribe to particular query responses.

Streaming database 220 includes

- data streams 222 received from multiple sources (e.g., ad servers 110) that contain real-time data concerning online advertisements for one or more advertisers (e.g., ad impression data, ad click through data, bid position data, ad spending data, and/or ad conversion data);
- adapters 224 that place the data in data streams 222 into a format suitable for storage in the streaming database 220 and for processing by query engine 226 (e.g., by formatting and ordering the data in the data streams 222 to be consistent with the schemas of corresponding tables in the streaming database 220); and
- query engine 226 that executes queries against streaming database 220 and/or relational database 232, including the application of continuous queries 228 and ad hoc queries 230 to data streams 222 and to ongoing responses produced by other continuous queries 228 (e.g., there can be a hierarchy of continuous queries in which a second continuous query is applied to the ongoing response of a first continuous query, a third continuous query is applied to the ongoing response of a second continuous query, and so on).

Relational database 232 includes non-streamed data (e.g., advertisers' budgets, bids, account balances and/or cumulative expenses, keywords 234) that are used in combination with streaming database 220 to answer queries. In some embodiments, relational database 232 is also used to store advertising statistics, such as snapshots of real-time advertising statistics.

Query response data 236 contains the responses generated by the execution of queries by the query engine 226 against the streaming database 220 and/or relational database 232. Query response data 236 are sent to the particular advertisers' rules 240 and/or advertising computers 104 that have subscribed to the query responses generated by corresponding queries.

Figure 3:
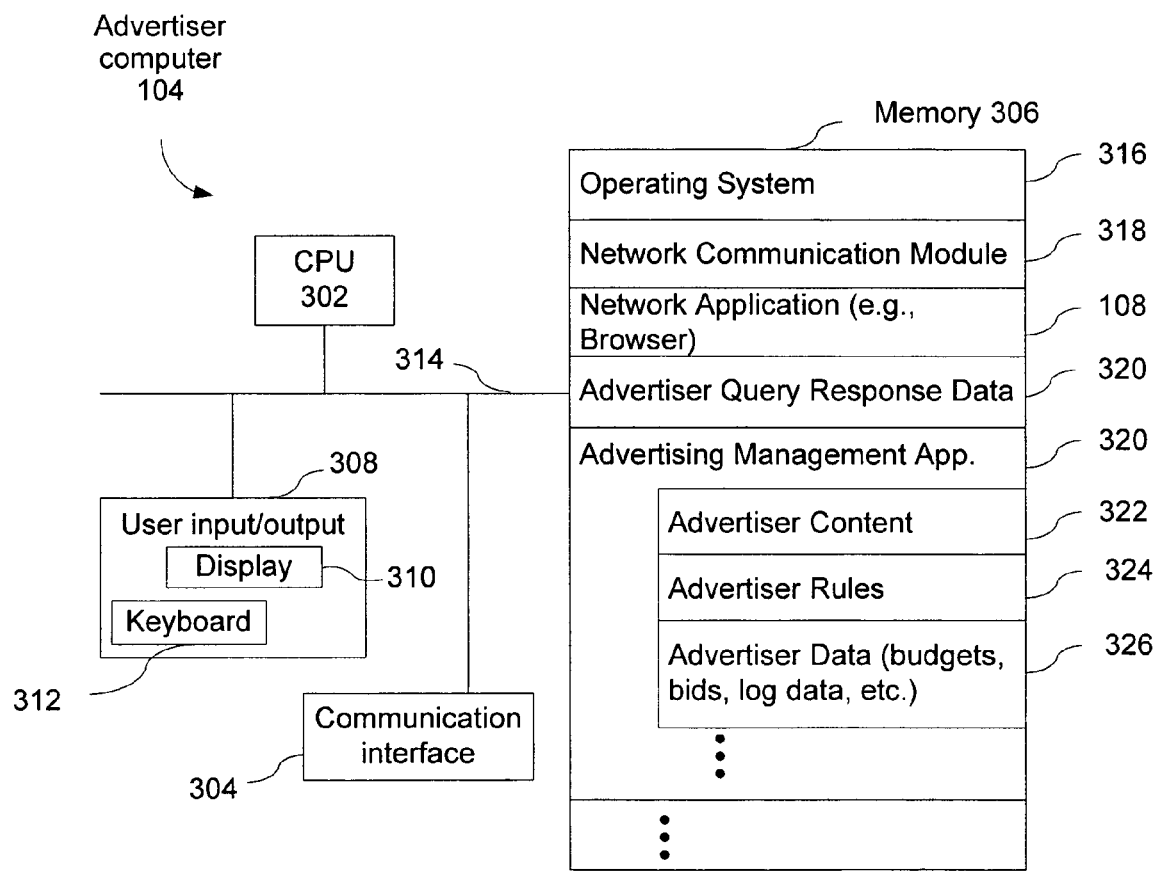
FIG. 3 is a block diagram illustrating an advertiser computer in accordance with one embodiment of the present invention.

FIG. 3 is a block diagram illustrating an advertiser computer in accordance with one embodiment of the present invention. Advertiser computer 104 can be any computer used by or on behalf of an advertiser. The aspects of FIG. 3 that are analogous to those in FIG. 2 are not described again here. The memory 306 in advertiser computer 104 stores the following programs, modules and data structures, or a subset or superset thereof:

- an operating system 316, analogous to operating system 216 described above;
- a network communication module 318, analogous to network communication module 218 described above;
- a network application 108, such as a web browser, that is used in some embodiments to view real-time advertising statistics, including advertiser query response data 320;
- advertiser query response data 320 that includes the portion of the query response data 236 that a particular advertiser subscribes to;
- advertisement management application 320 that manages the online advertising program for a particular advertiser and includes
  - advertiser content 322 that contains the advertisements used in a particular advertiser's online advertising program;
  - advertiser rules 324 that specify the online advertising program for a particular advertiser, including how that program is to be modified by responses to particular continuous queries performed by the query engine 226; and
  - advertiser data 326 that includes non-streamed data (e.g., advertisers' budgets, bids, account balances, etc.) that are used to manage a particular advertiser's online advertising program.

Referring to FIGS. 2 and 3, each of the above identified modules and applications corresponds to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 206 or 306 may store a subset of the modules and data structures identified above. Furthermore, memory 206 or 306 may store additional modules and data structures not described above.

Although FIGS. 2 and 3 show computers 102 and 104 as a number of discrete items, FIGS. 2 and 3 are intended more as functional descriptions of the various features that may be present in computers 102 and 104, rather than as a structural schematic of the embodiments described herein. In practice, and as recognized by those of ordinary skill in the art, items shown separately could be combined and some items could be separated. For example, some items shown separately in FIGS. 2 and 3 could be implemented on single computers and single items could be implemented by one or more computers. The actual number of computers used to implement ad placement provider computer 102 or advertiser computer 104 and how features are allocated among those computers will vary from one implementation to another, and may depend in part on the amount of data traffic that the ad placement provider computer system or advertiser computer system must handle during peak usage periods as well as during average usage periods.

In practice, the distribution of advertising program management and data storage functions between ad placement computer 102 and advertiser computers 104 can be divided up in many different ways. In some embodiments, advertising management application 320 is an applet running in network application 108 (e.g., a web browser), with the advertiser content 322 and rules 324 being input at advertiser computer 104, but stored in advertisers' content 242 and advertisers' rules 240. In other embodiments, advertising management application 320 is a separate application. In some embodiments, an advertiser's rules for how their online advertising program is to be modified in response to alerts/notifications are stored only in advertiser rules 324 on advertiser computer 104, rather than in advertisers' rules 240, too. In other embodiments, all of an advertiser's rules, including their rules for how their online advertising program is to be modified in response to alerts/notifications, are stored in both advertiser rules 324 and advertisers' rules 240.

Figure 4:
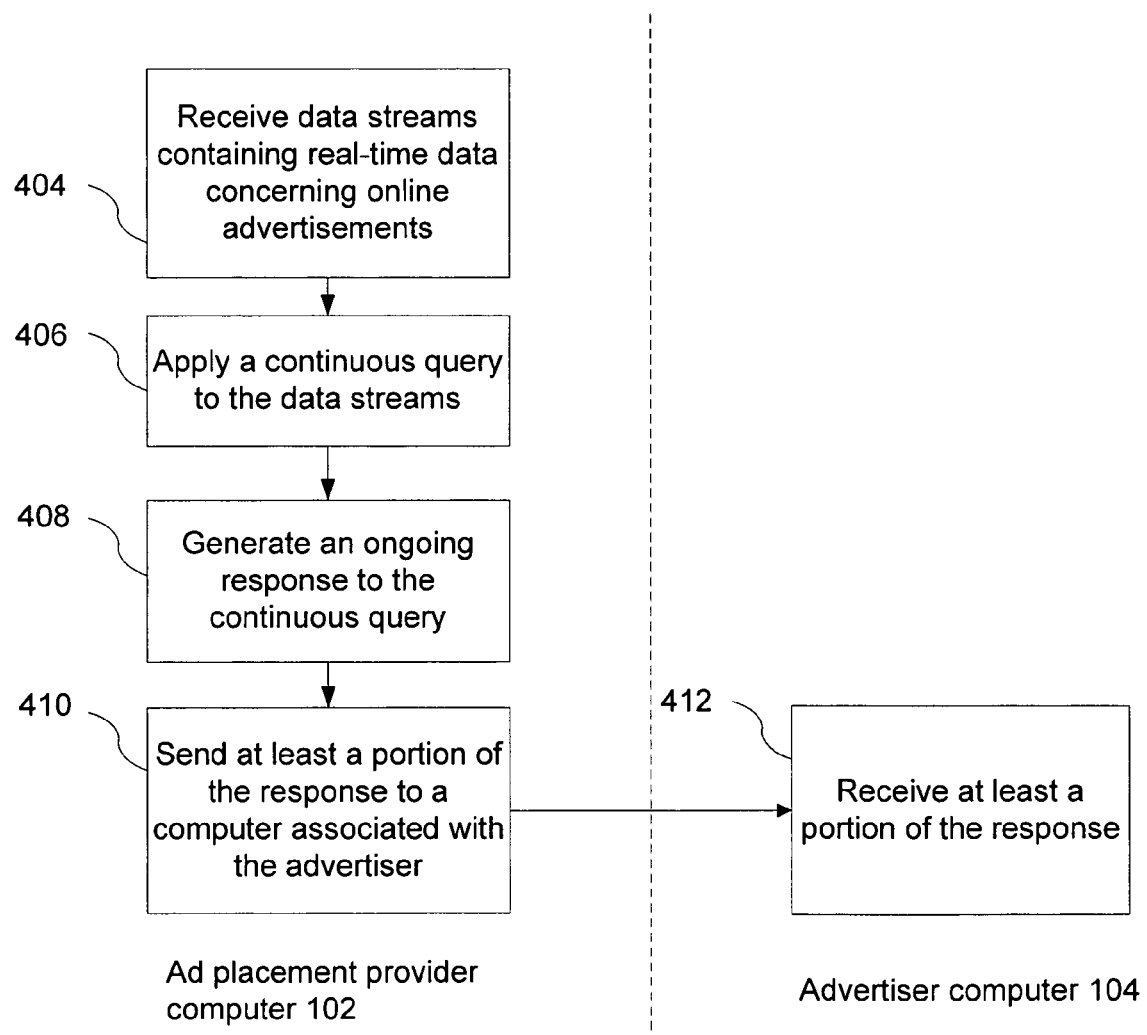
FIG. 4 is a flowchart representing a method of generating statistics, alerts, and other information regarding online advertising in real time according to one embodiment of the present invention.

FIG. 4 is a flowchart representing a method of generating statistics, alerts, and other information regarding online advertising in real time according to one embodiment of the present invention. It will be appreciated by those of ordinary skill in the art that one or more of the acts described may be performed by hardware, software, or a combination thereof, as may be embodied in one or more computing systems.

Streaming database 220 in ad placement provider computer 102 receives (404) one or more data streams 222 containing real-time data concerning online advertisements for an advertiser. In some embodiments, data streams 222 contain real-time data concerning online advertisements for a plurality of advertisers. In some embodiments, the real-time data includes one or more of ad impression data, ad click through data, bid position data, ad spending data, and ad conversion data. In some embodiments, the streaming database 220 joins a plurality of data streams 222 from multiple sources.

Figure 6:
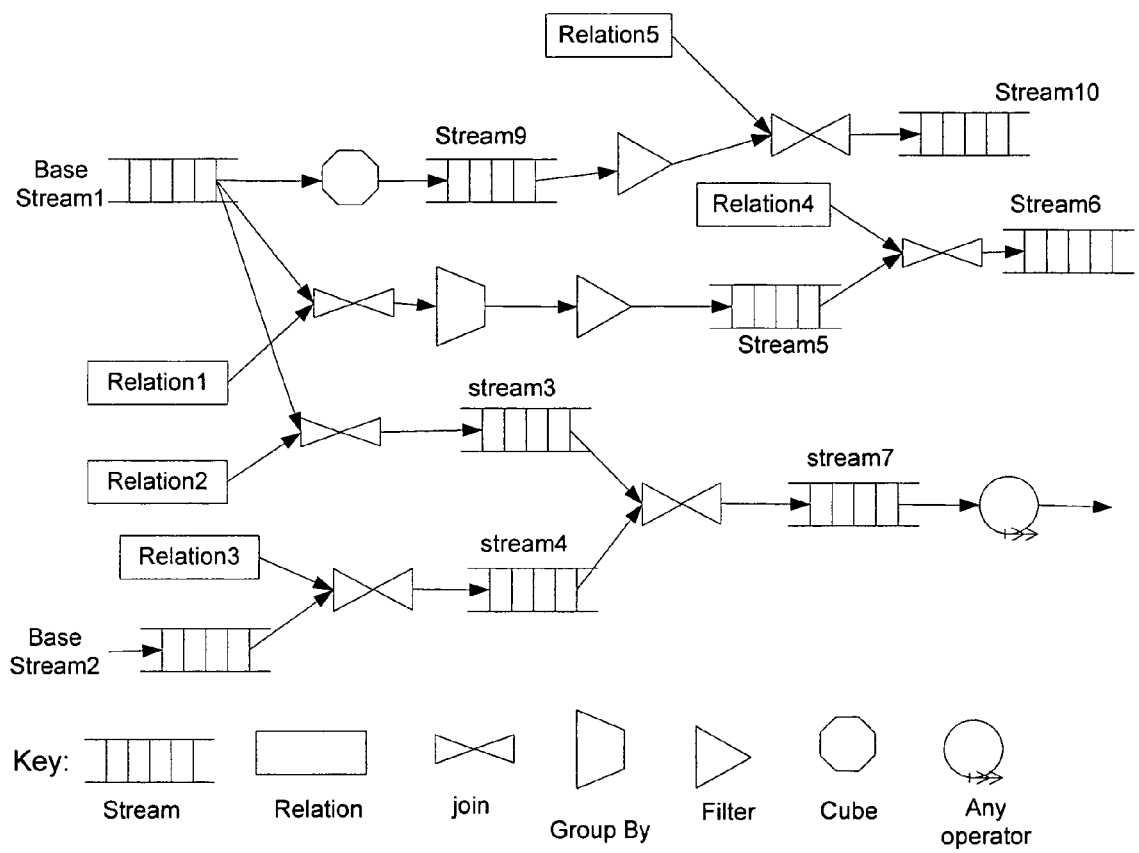
FIG. 6 is a block diagram illustrating the use of exemplary types of database operators in queries.

In some embodiments, query engine 226 maintains a network of continuous queries 228. Continuous queries 228 are applied to data streams 222 or other continuous queries, and can also be joined with relations (tables). In some embodiments, each query, ad hoc 230 or continuous 228, is compiled into a number of operators that implement the same operator interface. FIG. 6 is a block diagram illustrating the use of exemplary types of database operators in queries, including stream, relation, join, group by, filter, and cube operators. The operators form acyclic directed graphs.

In some embodiments, data flow from one operator to another through the shared publish/subscribe messaging module 244. An operator finishes its task and publishes its data to publish/subscribe module 244. This data is then consumed by all of its subscribers.

Most operators are non-blocking. The benefit of non-blocking query operators is that the workload can be partitioned and pipelined for a greater degree of parallel processing.

In FIG. 6, the BaseStreams (e.g. BaseStream1) are continuous data streams from one or more external sources, such as one or more Ad Servers 110 (FIG. 1), while the Relations (e.g., Relation1) are tables or portions of tables in a relational database. Continuous query Stream9 is derived from BaseStream1 through the application of data cube operator.

Stream 10 is the result of the joins between a filtered Stream9 and Relation5. Stream5 is the result of a join of BaseStream1 and Relation1, followed by a Group By operation (in some embodiments, window aggregation is implemented using the Group By operator), and then followed by a filter (e.g., the HAVING clause in SQL). Stream5 is joined with Relation4 to form Stream6. Stream 7 is formed by a join of Stream3 and Stream4; Stream3 is formed by a join of BaseStream1 and Relation2, while Stream4 is formed by a join of BaseStream2 and Relation3.

In some embodiments, each operator processes data in batch, and writes out its state (incrementally) to disk storage in memory 206 before publishing its results. A batch interval can be specified by a number of events or by a time interval, or both. Batch processing and writing to disk increases the processing latency, but helps ad placement provider computer 102 to scale and to more easily recover from hardware failures.

In some embodiments, data streams 222 are partitioned transparently, based on their timestamps. Within the same partition, the data may be partitioned again based on the semantics of a query. For example, the fields in the window partition clause or group by clause would serve as secondary partition keys to further parallelize processing the data.

Query engine 226 in ad placement provider computer 102 applies (406) a continuous query 228 to the one or more data streams 222. In some embodiments, continuous query 228 concerns online advertisement data for one advertiser in a plurality of advertisers. For example, for a particular advertiser's online advertising program, advertiser rules 324 may include rules that correspond to continuous queries input at advertiser computer 104, communicated to ad placement computer 102, stored in advertisers' rules 240, and implemented as continuous queries 228 of data streams 222. Publish/subscribe module 244 sends to the corresponding advertising computer 104 and/or advertisers' rules 240 the responses to continuous queries 228. In addition, some advertiser rules 324 may include continuous queries 228 that join data streams 222 with tables containing data from one or more sources (e.g., 234 and/or 326).

In some embodiments, a continuous query 228 is a sliding window query. In some embodiments, the continuous queries 228 and ad hoc queries 230 are Structured Query Language (SQL) queries.

For example, assume that there is a data stream called DailyCriteriaCreativeStats that provides click and impression data for each advertisement (also called a creative). The following continuous SQL query maintains the seven day moving average of the CTR for each advertisement for a given advertiser (customer):

```
create continuous query ctr_monitor as
select AdGroupCreativeId,
       customer_id,
       Date,
       sum(Clicks) over w/sum(Impressions) over w as CTR
from DailyCriteriaCreativeStats
window w as
    (
    partition by AgGroupCreativeId
    order by Date
    RANGE Interval '7' day preceding
    )
```

This example is a standard SQL-2003 query. It uses the window function feature in the ANSI-SQL OLAP feature set. To process the window clause, the row is partitioned based on its creative_id value into multiple partitions. For each partition, the rows are sorted based on the Date value (although an actual sort may not be required if the Date value was already sorted in the input stream DailyCriteriaCreativeStats). A row, based on the sorting order of Date, is placed in the window if its Date value falls within the time interval expression. An ANSI-SQL 2003 time interval type represents the difference between two timestamp values. So in this case, only rows that have Date values that are within the last seven days are placed in the window. To compute the CTR, the sum(Clicks) and sum(Impressions) are computed and then their division is computed incrementally for the rows in the window.

Table 1 illustrates exemplary input and output of the continuous query ctr_monitor.

TABLE 1

| DailyCriteriaCreativeStats | Date | AdGroupCreativeId | Clicks | Impressions | CostUS$ |
|---|---|---|---|---|---|
| | Jun. 24, 2004 | 1 | 10 | 100 | 10.1 |
| | Jun. 25, 2004 | 2 | 20 | 100 | 20.5 |
| | Jun. 26, 2004 | 1 | 30 | 100 | 32 |
| | Jun. 27, 2005 | 2 | 40 | 100 | 40 |
| CTR_Monitor | Date | AdGroupCreativeId | | CTR | |
| | Jun. 24, 2004 | 1 | | 0.1 | |
| | Jun. 25, 2004 | 2 | | 0.2 | |
| | Jun. 26, 2004 | 1 | | 0.3 | |
| | Jun. 27, 2004 | 2 | | 0.4 | |

In this example, the sliding window query is incrementally maintained, logically on a per log record basis. However, for performance purposes, the query result may be updated in batch mode, such as in one-minute intervals between updates.

The query engine 226 in ad placement provider computer 102 generates (408) an ongoing response to a continuous query 228. In some embodiments, the ongoing response is generated in real time. In some embodiments, the ongoing response includes, for a particular ad for a predetermined time period, one or more of the number of ad impressions, the number of click throughs, an average or current bid position, the total amount spent, the number of ad conversions, the click-through rate, and the cost per click through (CPC).

As used herein and as commonly understood by those of ordinary skill in the art, the number of ad impressions is the number of times an ad (or a group of ads) is displayed by an ad placement provider or by a party that displays ads for the ad placement provider. The number of click throughs is the number of times that users click on an ad (or group of ads) or otherwise indicate that they want to view more information related (e.g., hyperlinked) to the ad. The current or average bid position is the current or average placement position of an ad in a listing of ads. The total amount spent is the cost to an advertiser for a given ad or group of ads. The number of ad conversions is the number of times that an ad impression led to a sale (e.g., at a website hyperlinked to the ad). For a given ad (or group of ads), the click-through rate (CTR) is the number of click throughs divided by the number of impressions. For a given ad (or group of ads), the cost per click through (CPC) is the number of click throughs divided by the total amount spent for the ad. Each of the preceding terms is typically determined for a particular time period.

Continuing with the description of FIG. 4, the subscribe/publish module 244 in advertisement program manager 238 sends (410) at least a portion of the ongoing response to a computer associated with the advertiser, e.g., advertiser computer 104. Advertiser computer 104 receives (412) at least a portion of the ongoing response to the continuous query 228, e.g., via network application 108 and advertising management application 320.

In some embodiments, query engine 226 applies a second continuous query to the response (to the first continuous query) and generates a response to the second continuous query. In some embodiments, the response to the second continuous query is generated in real time. Subscribe/publish module 244 sends at least a portion of the response to the second continuous query to a computer associated with the advertiser, e.g., advertiser computer 104 and/or to an Advertiser Rule 324 associated with the advertiser. In some embodiments, the response to the second continuous query includes an alert. Advertiser computer 104 receives at least a portion of an ongoing response to the second continuous query. In some embodiments, advertiser computer 104 receives at least a portion of an ongoing response to the second continuous query in real time.

Figure 5:
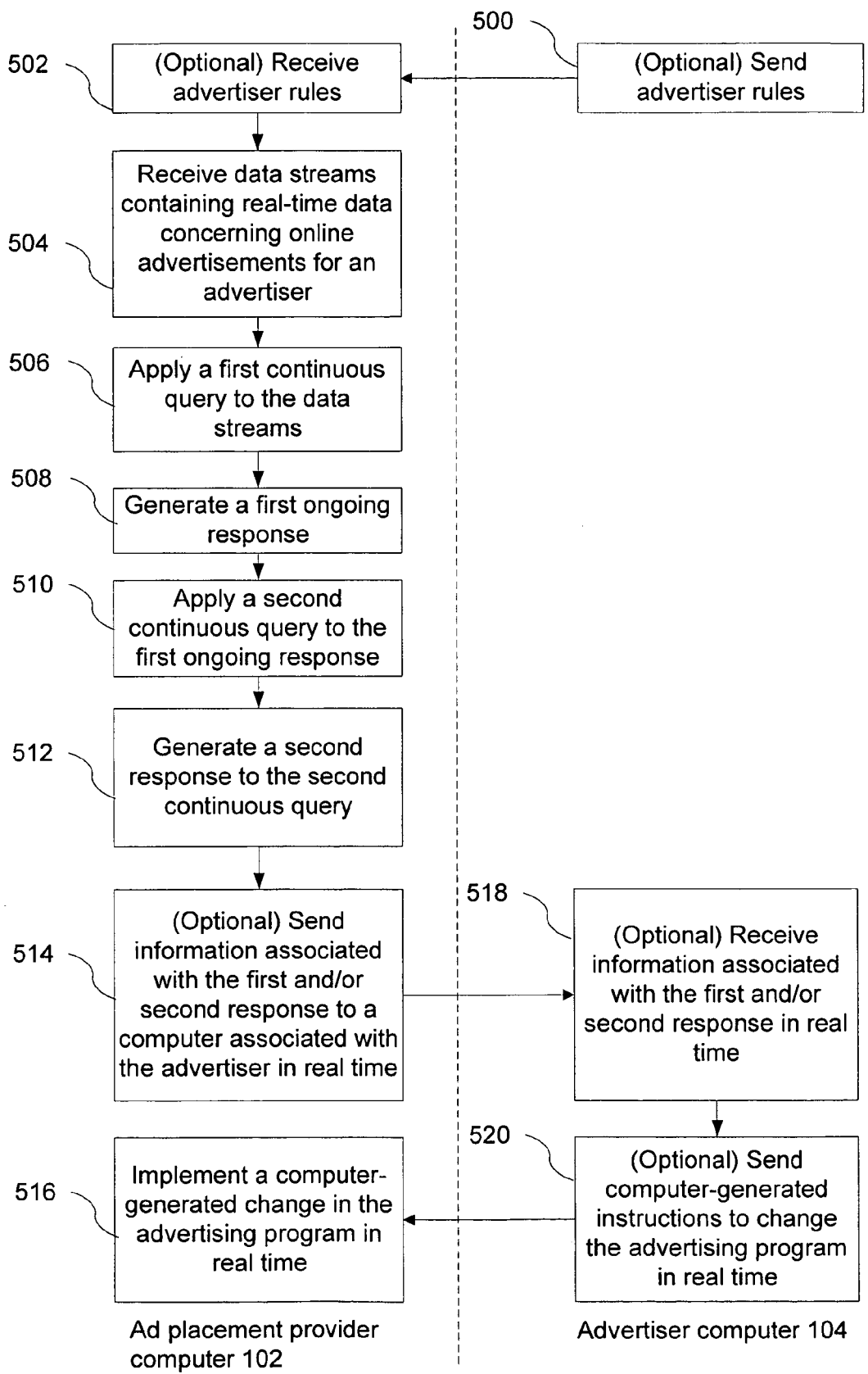
FIG. 5 is a flowchart representing a method of making computer-generated modifications to an online advertising program in real time according to one embodiment of the present invention.

FIG. 5 is a flowchart representing a method of making computer-generated modifications to an online advertising program in real time according to one embodiment of the present invention. It will be appreciated by those of ordinary skill in the art that one or more of the acts described may be performed by hardware, software, or a combination thereof, as may be embodied in one or more computing systems.

As used herein, an advertising program is one or more online advertisements along with a set of parameters that determine how the advertisements are used. Exemplary parameters include, without limitation, ad budgets, ad placement bidding rules (e.g., maximum cost per click through (CPC)), keywords associated with ads, ad distribution preferences, groupings of ads (e.g., combining individual ads into ad groups and combining ad groups into ad campaigns), and rules for modifying the placement of ads, ad groups, and/or ad campaigns in response to alerts or other notifications.

In some embodiments, advertiser computer 104 sends (500) and ad placement provider computer 102 receives (502) a set of computer-implemented rules 324 for the online advertising program for an advertiser. In some cases, rules 324 are specified at advertiser computer 104 by inputting user preferences via GUI 112 (e.g., via checkboxes in GUI 112). In other cases, rules 324 are specified at advertiser computer 104 by inputting custom code (e.g., SQL). Ad placement provider computer 102 stores the set of computer-implemented rules 324 for the online advertising program for the advertiser in the advertisers' rules 240 portion of advertisement program manager 238. In some embodiments, advertisement program manager 238 uses the received set of rules 324 to change the advertising program in real time.

Streaming database 220 at ad placement provider computer 102 receives (504) a plurality of data streams 222 containing real-time data concerning online advertisements in an online advertising program for an advertiser. While the explanation of FIG. 5 will focus on the processing of real time data for one online advertising program for one advertiser, it should be understood that the data streams 222 may contain real-time data concerning online advertisements in the online advertising programs of a plurality of advertisers, and the processing operations of FIG. 5 may be applied to the real-time data associated with a plurality of online advertising programs of a plurality of advertisers.

Query engine 226 of ad placement provider computer 102 applies (506) a first continuous query to the plurality of data streams 222 (e.g., the continuous query ctr_monitor described above), and generates (508) a first ongoing response to the first continuous query (e.g., the rows in Table 1 produced by the continuous query ctr_monitor described above).

The query engine 226 furthermore applies (510) a second continuous query to the first ongoing response, and thereby generates (512) a second response to the second continuous query. In some embodiments, the second response is an alert.

As noted above, rules (e.g., in advertiser rules 324 and advertisers' rules 240) can be specified as continuous queries 228, or may correspond to continuous queries. For example, a rule that identifies advertisements (creatives) that have a seven day moving CTR less than 1% can be defined as follows:

```
create continuous query low_ctr_rule as
select AdGroupCreativeId
from  ctr_monitor
where ctr_monitor.ctr < 0.01
```

An application (e.g., program manager 238 or management application 320) can subscribe (e.g., via publish/subscribe module 244) to the low_ctr_rule. When there is a row emitted from this rule query, the application will get a callback with the information in the select clause. The application can then process the alert associated with the rule accordingly.

In some embodiments, joins can be used in the rule queries to include contextual information for an alert. For example, suppose that the text of an advertisement is stored in a table named Creatives. A rule that includes the text of the advertisement when an alert is triggered can be defined as follows:

```
create continuous query low_ctr_rule2 as
  select AdGroupCreativeId, Creatives.Line1, Creatives.Line2,
Creatives.Line3, ctr,
    from ctr_monitor, Creatives
    where AdGroupCreativeId = Creatives.CreativeId
    and ctr < 0.01
```

In some cases, once a rule is fired, a customer may not want to receive the same alert every time a new event occurs that would satisfy the same condition. For example, suppose a rule is triggered when a CTR is below 1%. Suppose further that the customer only wants to receive an alert if the CTR goes over 1% and then dips below 1% again within the last day, and furthermore wants to receive this alert no more than once per day. To provide for this customer preference, a first continuous query ctr_threshold1 is defined as follows:

```
create continuous query ctr_threshold1 as
select AdGroupCreativeId,
    ctr,
    current(ctr) over w as current_ctr,
    previous(ctr) over w as previous_ctr,
    sum(case (when current_ctr< 0.01 and previous_ctr >=0.01)
        then 1
        else 0) as number_ctr_dip_below_threshold_occurence,
from ctr_monitor
window w as
    (order by Date
    partition by AdGroupCreativeId
    range interval '1' day preceding
    slide interval '1' day
    )
```

The current aggregate function takes the latest value of its input value expression that is within the window. The previous aggregate function takes the previous value of its input value expression. ("Previous" really means "last", but "last" is a keyword in SQL that means something different, so "previous" is used as the function name instead.) Current and previous aggregate functions are extension functions that are not defined in ANSI SQL 2003. The slide clause tells the query engine to move the window by 1 day when the date changes. So the number_ctr_dip_below_threshold_occurence counts the number of times that the CTR dips below 0.01 within the last day.

A second continuous query/rule can be defined as follows:

```
create continuous query low_ctr_rule3 as
select AdGroupCreativeId, ctr
from ctr_threshold1
where ctr_dip_below_threshold_occurence = 1
```

With this rule, an alert will only be triggered when the CTR goes over 1% and then dips below 1% again within the last day.

In some cases, a customer may not want to receive an alert unless a CTR stays below a threshold value (e.g., 1%) for a predetermined time period (e.g., a 1 hour window). In other words, if a CTR dips briefly below a threshold value and then recovers, a customer may not want to be notified. To provide for this customer preference, a first continuous query ctr_threshold2 is defined as follows:

```
create continuous query ctr_threshold2 as
select AdGroupCreativeId,
    ctr,
    current(ctr) over w as current_ctr,
    sum(case (when current_ctr >= 0.01)
        then 1
        else 0) as number_above_threshold
from ctr_monitor
window w as
    (order by Date
    partition by AdGroupCreativeId
    range interval '1' hour preceding)
```

A second continuous query/rule can be defined as follows:

```
create continuous query stay_low_ctr_rule as
select AdGroupCreativeId,
    ctr,
    sum(number_above_threshold) as sum_above_count
```

-continued

```
    from ctr_threshold2
    where number_above_threshold = 0
```

With this rule, an alert will only be triggered when the CTR is less than 1% for the entire preceding hour.

In some cases, a customer may want to look at trends and be alerted if a CTR dips below a threshold percentage of the CTR for an earlier time period (e.g., if the weekly CTR dips below 50% of the previous week's CTR). To provide for this customer preference, a first continuous query ctr_weekly_trend is defined as follows:

```
    create continuous query ctr_weekly_trend as
    select AdGroupCreativeId,
        customer_id,
        Date,
        sum(Clicks) over w/sum(Impressions) over w1 as
last_week_ctr,
        sum(Clicks) over w/sum(Impressions) over w2 as
this_week_ctr
    from DailyCriteriaCreativeStats
    window w1 as
        (
        partition by AgGroupCreativeId
        order by Date
        RANGE between Interval '14' day preceding and Interval
'7' day preceding
        ),
        w2 as
        (
        partition by AgGroupCreativeId
        order by Date
        RANGE Interval '7' day preceding
        )
```

A second continuous query/rule can be defined as follows:

```
    create continuous query bad_weekly_ctr_trend_rule as
    select AdGroupCreativeId, this_week_ctr, last_week_ctr
    from   ctr_weekly_trend
    where  this_week_ctr/last_week_ctr < 0.5
```

With this rule, an alert will only be triggered when this week's CTR is less than 50% of the previous week's CTR.

In response to an event associated with generating the first or second response, ad placement provider computer 102 (i.e., advertising program manager 238) implements (516) a computer-generated change in the advertising program in real time.

In some embodiments, ad placement provider computer 102 sends (514) information associated with the first and/or second response to a computer associated with the advertiser (e.g., advertiser computer 104) in real time. In response to sending the information, ad placement provider computer 102 receives computer-generated instructions 324 from a remote computer (e.g., advertiser computer 104) to change the online advertising program and implements (516) the computer-generated change in the online advertising program in real time.

In some embodiments, advertiser computer 104 receives (518) information associated with a first response, a second response, or both the first response and the second response, and sends (520) computer-generated instructions 324 to change the online advertising program for the advertiser in real time.

In some embodiments, the computer-generated change modifies an advertisement placement bid for the advertiser. In some embodiments, the advertisement placement bid relates to a particular advertisement or to a group of advertisements. For example, the bid for an ad or for a group of ads can be raised if an alert signals that the display position has fallen below a particular threshold (e.g., the third position). Alternatively, the bid price could be raised if an alert signals that the CTR fell below a certain threshold, which may improve the bid position and increase the CTR. As another example, the bid price could be lowered if an alert signals that the remaining daily budget for an ad or group of ads has fallen below a predetermined threshold before a particular time of the day. In another example, the bid price could be lowered if an alert signals that the display position is higher than a specified threshold (e.g., the advertiser may not want to pay for placement at the highest display position).

In some embodiments, the computer-generated change modifies an advertising spending budget for the advertiser. The advertising spending budget could be the budget for a particular ad, the budget for a group of ads, or the budget for a particular time period (e.g., a day, week, or month). For example, the daily budget could be raised for a day in which the ad placement provider has unusually high traffic, to prevent the ad program from running out of money early in the day.

In some embodiments, the computer-generated change modifies one or more ads being displayed for a particular advertiser. In some embodiments, the computer-generated change stops displaying an ad for the advertiser. For example, ads with low CTR or low conversion rates could be replaced by completely new ads or by ads with higher CTR or higher conversion rates.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising,
   at a computer associated with an ad placement provider:
   receiving a plurality of data streams containing real-time data concerning online advertisements in an online advertising program for an advertiser;
   applying a first continuous query to the plurality of data streams;
   generating a first ongoing response to the first continuous query;
   applying a second continuous query to the first ongoing response;
   generating a second response to the second continuous query;
   sending information associated with the first ongoing response and/or the second response to a computer associated with the advertiser in real time;
   in response to sending the information, receiving computer-generated instructions from a remote computer to change the online advertising program; and implementing the computer-generated change in the online advertising program in real time.

2. A method comprising, at a computer associated with an ad placement provider, receiving a plurality of data streams containing real-time data concerning online advertisements in an online advertising program for an advertiser;

applying a first continuous query to the plurality of data streams;

generating a first ongoing response to the first continuous query;

applying a second continuous query to the first ongoing response;

generating a second response to the second continuous query; and in response to an event associated with generating the first or second response, implementing a computer-generated change in the advertising program in real time.

3. The method of claim 2, wherein the second response is an alert.

4. The method of claim 2, wherein the computer-generated change modifies a advertisement placement bid for the advertiser.

5. The method of claim 4, wherein the advertisement placement bid relates to a particular advertisement or to a group of advertisements.

6. The method of claim 2, wherein the computer-generated change modifies an advertising spending budget for the advertiser.

7. The method of claim 2, wherein the computer-generated change modifies one or more ads being displayed for a particular advertiser.

8. The method of claim 2, wherein the computer-generated change stops displaying an ad for the advertiser.

9. The method of claim 2, including receiving a set of computer-implemented rules for the online advertising program for an advertiser.

10. The method of claim 9, including using the received set of rules to change the advertising program in real time.

11. A computer system comprising at least one computer associated with an ad placement provider, wherein the computer system is configured to:

receive a plurality of data streams containing real-time data concerning online advertisements in an online advertising program for an advertiser;

apply a first continuous query to the plurality of data streams;

generate a first ongoing response to the first continuous query;

apply a second continuous query to the first ongoing response;

generate a second response to the second continuous query; and in response to an event associated with generating the first or second response, implement a computer-generated change in the advertising program in real time.

12. A machine readable medium having stored thereon data representing sequences of instructions, which when executed by a computer system associated with an ad placement provider, cause the computer system to:

receive a plurality of data streams containing real-time data concerning online advertisements in an online advertising program for an advertiser;

apply a first continuous query to the plurality of data streams;

generate a first ongoing response to the first continuous query;

apply a second continuous query to the first ongoing response;

generate a second response to the second continuous query; and in response to an event associated with generating the first or second response, implement a computer-generated change in the advertising program in real time.

13. A system, comprising:

means for receiving a plurality of data streams containing real-time data concerning online advertisements in an online advertising program for an advertiser;

means for applying a first continuous query to the plurality of data streams;

means for generating a first ongoing response to the first continuous query;

means for applying a second continuous query to the first ongoing response;

means for generating a second response to the second continuous query; and in response to an event associated with generating the first or second response, means for implementing a computer-generated change in the advertising program in real time.

14. A method comprising, at a computer associated with an advertiser, receiving information associated with a first response, a second response, or both the first response and the second response, wherein the first response is generated at a remote computer by applying a first continuous query to a plurality of data streams containing information about online advertisements in an online advertising program for the advertiser and wherein the second response is generated at the remote computer by applying a second continuous query to the first response; and sending computer-generated instructions to change the online advertising program for the advertiser in real time.

15. A system comprising:

a computer associated with an advertiser, wherein the computer is configured to receive information associated with a first and/or second response, wherein the first response is generated at a remote computer by applying a first continuous query to a plurality of data streams containing information about online advertisements in an online advertising program for the advertiser and wherein the second response is generated at the remote computer by applying a second continuous query to the first response; and send computer-generated instructions to change the online advertising program for the advertiser in real time.

16. A machine readable medium having stored thereon data representing sequences of instructions, which when executed by a computer associated with an advertiser, cause the computer to:

receive information associated with a first response and/or a second response, wherein the first response is generated at a remote computer by applying a first continuous query to a plurality of data streams containing information about online advertisements in an online advertising program for the advertiser and wherein the second response is generated at the remote computer by applying a second continuous query to the first response; and send computer-generated instructions to change the online advertising program for the advertiser.

17. A system, comprising:

a computer associated with an advertiser, wherein the computer includes means for receiving information associated with a first response and/or a second response, wherein the first response is generated at a remote computer by applying a first continuous query to a plurality of data streams containing information about online advertisements in an online advertising program for the advertiser and wherein the second response is generated at the remote computer by applying a second continuous query to the first response; and means for sending computer-generated instructions to change the online advertising program for the advertiser.

* * * * *